Jan. 5, 1932.  B. H. SMITH  1,839,608

RECORDING VOLT AMPERE METER

Filed April 11, 1929

INVENTOR
Benjamin H. Smith.
BY
ATTORNEY

Patented Jan. 5, 1932

1,839,608

UNITED STATES PATENT OFFICE

BENJAMIN H. SMITH, OF MAPLEWOOD, NEW JERSEY, ASSIGNOR TO WESTINGHOUSE ELECTRIC & MANUFACTURING COMPANY, A CORPORATION OF PENNSYLVANIA

RECORDING VOLT-AMPERE-METER

Application filed April 11, 1929. Serial No. 354,305.

My invention relates to electrical measuring instruments and more particularly to recording volt-ampere-hour meters.

My invention has for an object to provide a device for recording volt-amperes, wherein the time keeping and chart-driving motor also operates as a phase-shifting generator for energizing the measuring instrument.

Briefly, my invention consists of a recording volt-ampere meter comprising the combination with a polyphase intergrating meter of the watthour type, a stylus driven by said meter, and a chart coacting with said stylus, of a phase shifter for driving said chart, energizing said meter and periodically disconnecting the drive between said stylus and said meter.

My invention, however, may be more readily understood by reference to the accompanying drawings in connection with the following description.

Figure 1:
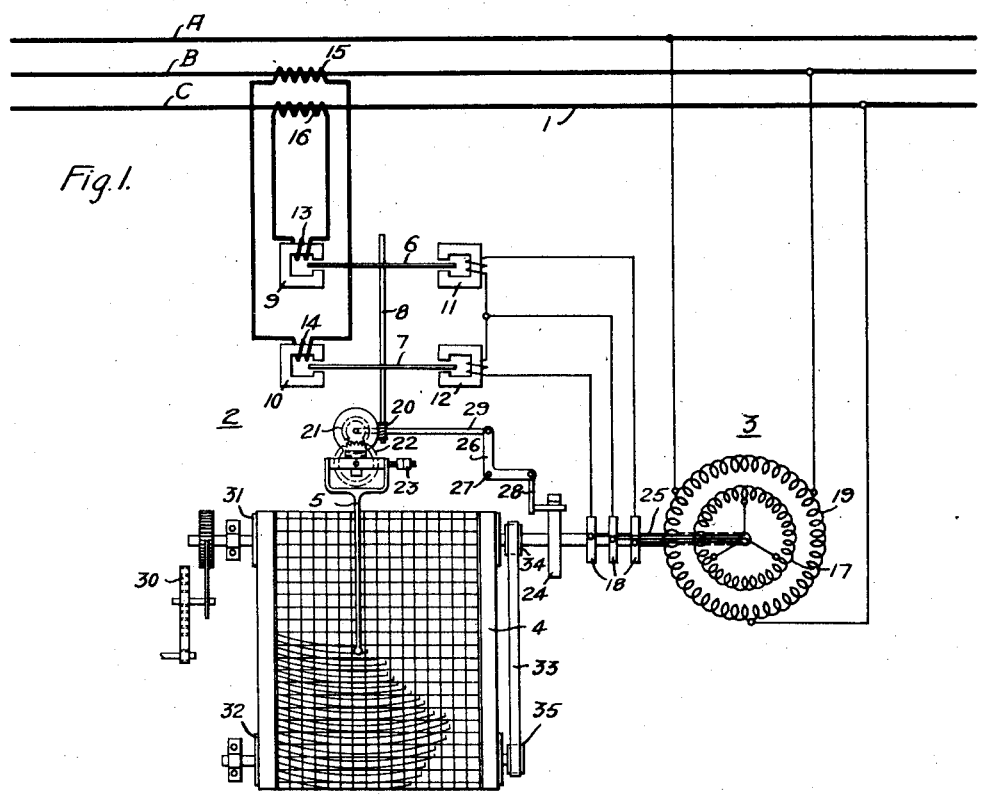
Figure 2:
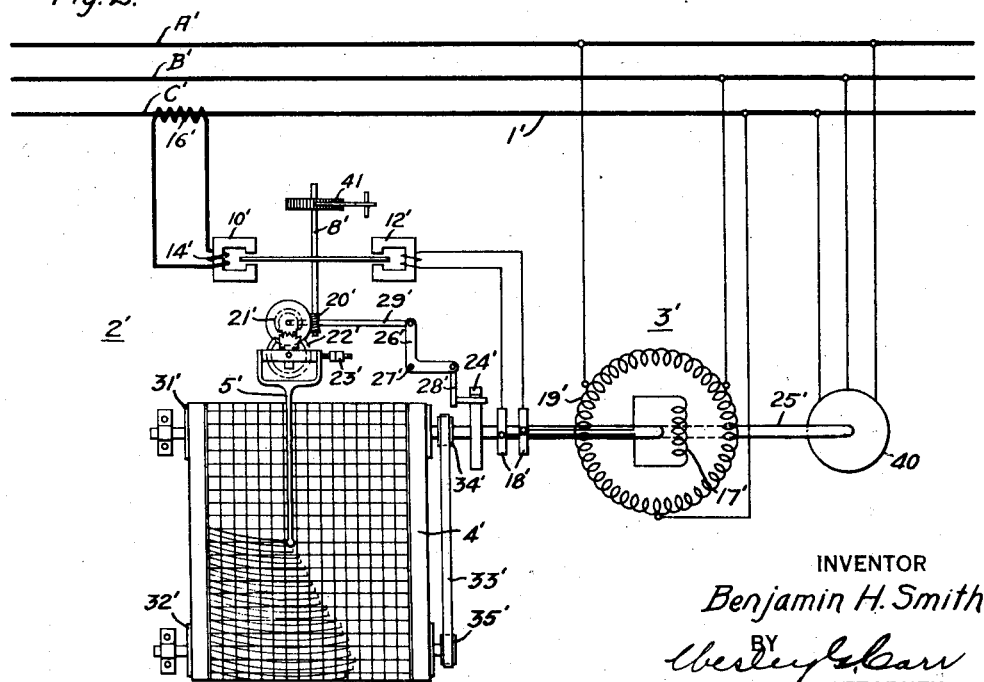

Fig. 1 is a diagrammatic view of a recording volt-ampere-hour meter constructed in accordance with my invention, and Fig. 2 is a view similar to Fig. 1 of a modification of my invention.

A polyphase transmission line 1, illustrated in the present case as a three-phase circuit comprising conductors A, B and C, transmits alternating-current power from the usual source of supply (not shown) to the usual consumer of electrical power (not shown). It is the purpose of my invention to provide a device for recording the volt-ampere-hour demand of the transmission line 1 and, to this end, I energize a polyphase watthour-type demand meter 2 in accordance with the volts and amperes of the circuit 1, regardless of their relative phase position, by the aid of a phase-shifting generator 3.

The phase-shifting generator 3 is also used, as a motor, to drive the recording chart 4 and to periodically reset the stylus 5.

The polyphase recording demand meter 2 comprises a plurality of discs 6 and 7 of conducting material that are mounted on a rotatable shaft 8. The shaft 8 is driven by the discs 6 and 7 under the influence of coacting phase-displaced fluxes from laminated current cores 9 and 10 and voltage cores 11 and 12. The current and voltage cores are usually combined in a single laminated core, but, for clearness of illustration, they are shown separated.

The current cores 9 and 10 are provided with windings 13 and 14, respectively, which are connected to the secondary windings 15 and 16 of current transformers associated with conductors B and C. The voltage cores 11 and 12 are provided with windings that are connected to the three-phase secondary winding 17 of the phase shifter 3 by means of slip rings 18. The primary winding 19 of the phase shifter 3 is connected in delta to the conductors A, B, and C of the transmission line 1.

The operation of the phase shifter 3, in connection with the induction elements of the meter 2, is fully set forth in Patent No. 1,547,659 issued July 28, 1925, to B. E. Lenehan, entitled Volt-ampere meter and assigned to the Westinghouse Electric and Manufacturing Company, and reference may be made thereto for an understanding of how the phase shifter and the meter cooperate to cause the shaft 8 to be turned in accordance with the volt-ameperes traversing the line 1. Suffice it to say here, that the meter 2 measures the volt-ampere-hours of the circuit 1.

The shaft 8 is provided with a worm 20 that drives a worm wheel 21 which, in turn, drives a gear wheel 22. The gear wheel 22 is securely fixed to the shaft of the stylus 5 which is provided with a weight 23 for returning it to an initial position when the drive between the worm wheel 21 and the worm 20 is disconnected. This disconnection is performed by the rotation of a cam 24, mounted on the shaft 25 of the rotor of the phase shifter 3, which actuates a bell crank 26, pivoted at 27, through a connecting link 28. A rod 29, connected, at one end, to the axis of the gear wheel 21 and, at the other end, to the bell crank 26, transmits the motion of the bell crank 26 to the gear wheel 21 and disconnects the latter from the worm 20 every fifteen minutes, or other suitable period of time. The shaft 25 and the cam 24 are permitted to rotate only at a constant speed of rotation by an escapement mechanism 30.

The chart 4 is moved at a uniform speed from a supply roll 31 to a re-roll 32 by the shaft 25. A belt 33, connecting pulleys 34 and 35, rotates the re-roll 32 in accordance with the rotation of the supply roll 31, in the usual manner.

The rotor of the phase shifter drives the chart 4 at a constant speed and, at the same time, periodically trips the drive of the stylus 5 to permit it to return to an initial position. In addition, the phase shifter 3 supplies current to the voltage coils of the meter 2 to produce a flux which coacts with the current flux produced by the current coils 13 and 14 to cause the shaft 8 to rotate in accordance with the volt-amperes traversing the circuit 1. The phase shifter 3 does three things; namely, it energizes the meter 2 with electrical currents of the proper phase and magnitude; it drives the recording chart at a uniform speed, and it periodically resets the stylus 5.

From the above description, it is apparent that my novel use of the phase shifter 3 obviates the necessity for a clock, for timekeeping, and a separate motor for driving the chart and resetting the stylus. The cost and simplicity of my recording volt-ampere-hour demand meter, therefore, compares most favorably with prior meters for this purpose.

In Fig. 2 is illustrated a modification of the device shown in Fig. 1. All of the elements are the same with the exception of the phase shifter. In the modification, a phase shifter of the type disclosed in the patent to J. Slepian, volt-ampere meter, No. 1,584,670, dated May 11, 1926, is utilized. A synchronous motor 40 is connected to the line 1 to drive the single winding 17' of the rotor of the phase shifter 3' at a constant speed. The winding 17' is connected, through slip rings 18', to the voltage coil wound on the laminated voltage core 12' of the induction meter 2'. The primary winding 19' of the phase shifter 3' is connected, in delta, to the conductors A', B', and C' of the line 1'.

The shaft 25', which supports the synchronous motor 40, the rotor winding 17' and the slip rings 18', drives the supply drum 31' and re-roll drum 32' of the chart 4' by means of belt 33' and pulleys 34' and 35', in the manner set forth above in connection with the meter shown in Fig. 1.

The meter 2' comprises the usual single-phase watt hour meter of the induction type modified by a ratchet 41 for limiting the rotation of the shaft 8' to one direction. The current core 10' is energized by a coil 14' which is connected to the secondary winding of a current transformer 16' associated with the main conductor C.

In this case, the synchronous motor drives the phase shifter 3' and the recording chart 4' and periodically resets the stylus 5' to an initial position. Since the synchronous motor 40 operates at a constant speed, the necessity for the escapement mechanism 30 is avoided with the exception of the details in structure noted, the recording meter illustrated in Fig. 2 is similar to that shown in Fig. 1.

It will be apparent to those skilled in the art that phase shifters and measuring instruments of types differing from those shown and described may be employed without departing from the spirit and scope of my invention, as set forth in the appended claims.

I claim as my invention:

1. In a recording meter, the combination with an integrating meter, a stylus driven by said integrating meter, and a chart coacting with said stylus, of a phase-shifting motor-generator set for driving said chart, energizing said meter and periodically disconnecting the drive between said stylus and said instrument.

2. In a recording meter, the combination with a measuring instrument, recording means associated therewith, and driven thereby and a phase-shifter operatively associated with both said instrument and said recording means.

3. In a recording meter, the combination with a measuring instrument, a recording member driven by said instrument, and a record-receiving member coacting with said recording member, of a phase shifter electrically connected to said measuring instrument and mechanically associated with said recording members.

4. In combination, a movable meter armature, actuating coils therefor responsive to the current and the voltage, respectively, of a given circuit, a stylus responsive to movement of said armature, a movable record chart for cooperation with the stylus, means including a primary voltage winding energized in accordance with the voltage of said circuit and a movable secondary element inductively related to said primary winding for energizing said voltage coil and moving said chart, and means causing said secondary element to move at a constant speed.

5. In combination, a movable meter armature, actuating coils therefor responsive to the current and the voltage, respectively, of a given circuit, a stylus responsive to movement of said armature, a movable record chart for cooperation with the stylus, means for periodically interrupting the operative relation between the armature and the stylus, means including a primary voltage winding energized in accordance with the voltage of said circuit and a movable secondary element inductively related to said primary winding for energizing said voltage coil, moving said chart and actuating said interrupting means, and means causing said secondary element to move at a constant speed.

In testimony whereof, I have hereunto subscribed my name this 2nd day of April, 1929.

BENJAMIN H. SMITH.